(12) United States Patent
Heinonen et al.

(10) Patent No.: US 8,514,818 B2
(45) Date of Patent: Aug. 20, 2013

(54) SYSTEM AND METHODS FOR GENERATING MASKING SEQUENCES

(75) Inventors: Jari Matti Juhani Heinonen, Oulu (FI); Jukka Tapani Toivanen, Oulu (FI); Lauri Pirttiaho, Oulu (FI); Arto Ilmari Huotari, Oulu (FI)

(73) Assignee: Nokia Corporation, Espoo (FI)

( * ) Notice: Subject to any disclaimer, the term of this patent is extended or adjusted under 35 U.S.C. 154(b) by 1122 days.

(21) Appl. No.: 12/343,832

(22) Filed: Dec. 24, 2008

(65) Prior Publication Data

US 2009/0270095 A1   Oct. 29, 2009

Related U.S. Application Data

(60) Provisional application No. 61/048,089, filed on Apr. 25, 2008.

(51) Int. Cl.
*H04B 7/216* (2006.01)

(52) U.S. Cl.
USPC .......................................... 370/335; 455/434

(58) Field of Classification Search
USPC ............................. 370/338, 328, 335; 455/73
See application file for complete search history.

(56) References Cited

U.S. PATENT DOCUMENTS

| | | | |
|---|---|---|---|
| 5,353,352 A | 10/1994 | Dent et al. | |
| 6,973,579 B2 | 12/2005 | Dick et al. | |
| 2005/0232214 A1 | 10/2005 | Dottling et al. | |
| 2007/0218901 A1 | 9/2007 | Tenny | |
| 2008/0205349 A1* | 8/2008 | Kim et al. | 370/335 |
| 2011/0205992 A1* | 8/2011 | Rudolf et al. | 370/329 |

OTHER PUBLICATIONS

3GPP TS 25.212 V7.7.0 (Nov. 2007); 3$^{rd}$ Generation Partnership Project; Technical Specification Group Radio Access Network; Multiplexing and channel coding (FDD); (Release 7); 103 pages.
Office Action for Chinese Application No. 200980124316.9; dated May 6, 2013.

* cited by examiner

*Primary Examiner* — Kevin C Harper
*Assistant Examiner* — Henry Baron
(74) *Attorney, Agent, or Firm* — Alston & Bird LLP

(57) ABSTRACT

Systems and methods for providing HS-SCCH masking and unmasking operations using user equipment identification field in generating a user equipment specific masking sequence are disclosed. The 1/2 rate convolution coding and the rate matching operations required to form the UE specific masking sequence to mask and unmask high speed shared control channel (HS-SCCH) packets are performed in a single operation. Look up tables and matrix coefficients used to provide a simple computation method to generate the needed UE specific masking sequence are provided. Apparatus and methods to use the UE specific masking sequence to unmask the HS-SCCH packets in a packet based radio frequency signaling communication system are disclosed.

16 Claims, 15 Drawing Sheets

```
void hrnti_calc_new( uint16 hrnti_16_input, uint16 *hrnti_40_output )
{
    uint32 output_table1[256] = {pre-calculated table with 28-bit values,
                                 to be used for the 8 MSBs in UE ID };
    uint32 output_table2[256] = {pre-calculated table with 28-bit values,
                                 to be used for the 8 LSBs in UE ID };

uint32 output1, output2, temp;

output1 = output_table1[hrnti_16_input >> 8];
    output2 = output_table2[hrnti_16_input & 0x00ff];

temp = output1 ^ (output2 << 12);         /* 16 MSB from the 1st table and
                                                 16 LSB of the the 2nd table XORed */
    *hrnti_40_output++ = (uint16) temp;
    *hrnti_40_output++ = (uint16) (temp >> 16);
    *hrnti_40_output++ = (uint16) (output2 >> 20);
}
```

FIGURE 8

```
gmatrix{
    0x0000000389E,
    0x000000E27D,
    0x00000389FA,
    0x00000E27E8,
    0x0000389FB0,
    0x0000E27EC0,
    0x000389FB00,
    0x000E27EC00,
    0x00389FB000,
    0x00E27EC000,
    0x0389FB0000,
    0x0E27EC0000,
    0x189FB00000,
    0x627EC00000,
    0xC9FB000000,
    0x87EC000000 };
```

FIGURE 11

```
ue_mask_40_bits = 0 /* start with zeroed UE mask */ test_bit_mask = 1; /* variable used for testing which UE ID bits are
    set */ for (loopc = 0; loopc < 16; loopc++) /* loop for all 16 input bits */
if (ue_id_16_bits & test_bit_mask) /* check if certain UE ID bit is
    set */
{
    /* if bit was set XOR respective bit mask from table with
    existing 40 bit mask */
    ue_mask_40_bits = ue_mask_40_bit ^ gmatrix[loopc];
}
test_bit_mask <<= 1; /* move to the next input bit */
}
```

FIGURE 12

```
const uint40 gmatrix[] =
{
    0x87EC000000,
    0xC9FB000000,
    0x627EC00000,
    0x189FB00000,
    0x0E27EC0000,
    0x0389FB0000,
    0x00E27EC000,
    0x00389FB000,
    0x000E27EC00,
    0x000389FB00,
    0x0000E27EC0,
    0x0000389FB0,
    0x00000E27E8,
    0x00000389FA,
    0x000000E27D,
    0x0000000389E };
```

```
void hrnti_calc_new ( uint16
    hrnti_16_input, uint16
    *hrnti_40_output )
{
    unsigned long long acc0;
    unsigned long long acc1;
    uint16 r0,r1;
    const uint32 *gp = gmatrix;
    acc0 = 0;

while ( hrnti_16_input ) {
        acc1 = *gp++;
        r1 = hrnti_16_input & 1;
        hrnti_16_input >>= 1;
        acc0 = acc0 ^ ( acc1 & -r1 );
    }

*hrnti_40_output++ = acc0;
    acc0 >>= 16;
    *hrnti_40_output++ = acc0;
    acc0 >>= 16;
    *hrnti_40_output = acc0;
}
```

FIGURE 13

```c
void hrnti_calc_new ( uint16 hrnti_16_input,
       uint16 *hrnti_40_output )
{
    unsigned long long acc0;
    unsigned long long acc1;
    uint16 r0,r1;
    const uint32 *gp = gmatrix;
    acc0 = 0;

while ( hrnti_16_input ) {
        acc1 = *gp++;
        r0 = acc1 & 0xff;
        acc1 >>= 8;
        r1 = hrnti_16_input & 1;
        hrnti_16_input >>= 1;
        acc0 ^= ( acc1 & -r1 ) << r0
    }

*hrnti_40_output++ = acc0;
    acc0 >>= 16;
    *hrnti_40_output++ = acc0;
    acc0 >>= 16;
    *hrnti_40_output = acc0;
} const uint32 gmatrix[] =
{
    0x0021FB1A,
    0x00C9FB18,
    0x0189FB16,
    0x0189FB14,
    0x0389FB12,
    0x0389FB10,
    0x0389FB0E,
    0x0389FB0C,
    0x0389FB0A,
    0x0389FB08,
    0x0389FB06,
    0x0389FB04,
    0x01C4FD03,
    0x01C4FB01,
    0x00E27D00,
    0x001C4F01 };
```

FIGURE 14

SYSTEM AND METHODS FOR GENERATING MASKING SEQUENCES

CROSS-REFERENCES

This application claims the benefit of the following provisionally filed U.S. patent application: Application Ser. No. 61/048,089, filed Apr. 25, 2008, and entitled "System and Methods for Generating User Equipment Specific Masking Sequences," which application is hereby incorporated herein by reference.

TECHNICAL FIELD

The present invention relates to a circuit and method for providing the user equipment specific masking sequences needed for scrambling and descrambling operations in a packet based communication system.

BACKGROUND

As wireless communication systems such as cellular telephone, satellite, and microwave communication systems become more widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

Current systems implement wireless communications using standard protocols including Universal Mobile Telecommunications System ("UMTS"), UMTS Terrestrial Radio Access Network ("UTRAN"), and third generation wireless ("3G"), Wideband Code Division Multiple Access ("WCDMA"), for examples, which support HDSPA communications between mobile equipment. The mobile equipment includes user equipment ("UE") such as cellphones, and fixed transceivers that support mobile telephone cells, such as base stations, referred to as "Node B" (or "NB") and when enhanced, or evolved to a new standard protocol, referred to as "e-Node B" (or "eNB").

The Third Generation Partnership Project Long Term Evolution ("3GPP LTE") is the name generally used to describe an ongoing effort across the industry to improve UMTS. The improvements are being made to cope with the continuing flow of new requirements and the growing base of users. Goals of this broadly based project include improving communication efficiency, lowering costs, improving services, making use of new spectrum opportunities, and achieving better integration with other open standards and backwards compatibility with some existing infrastructure that is compliant with earlier standards. The project envisions a packet switched communications environment with support for such services as Voice over Internet Protocol ("VoIP") and Multimedia Broadcast/Multicast Services ("MBMS"). MBMS may support services where base stations transmit to multiple UEs simultaneously, such as mobile television or radio broadcasts, for example. The 3GPP LTE project is not itself a standard-generating effort, but will result in new recommendations for standards for the UMTS.

UTRAN includes multiple Radio Network Subsystems ("RNS"), each of which contains at least one Radio Network Controller ("RNC"). However, it should be noted that the RNC may not be present in the actual future implemented systems incorporating Long Term Evolution ("LTE") of UTRAN, evolved UTRAN ("E-UTRAN"). LTE may include a centralized or decentralized entity for control information. In UTRAN operation, each RNC may be connected to multiple Node Bs which are the UMTS counterparts to Global System for Mobile Communications ("GSM") base stations. In E-UTRAN systems, the e-Node B may be, or is, connected directly to the access gateway ("aGW," sometimes referred to as the services gateway "sGW"). Each Node B may be in radio contact with multiple UE devices (generally, user equipment including mobile transceivers or cellular phones, although other devices such as fixed cellular phones, mobile web browsers, laptops, PDAs, MP3 players, and gaming devices with transceivers may also be UE) via the radio air interface.

The wireless communication systems as described herein are applicable to, for instance, 3G, and UTRAN systems. In the future, 3GPP LTE compatible wireless communication systems will be implemented. In general, E-UTRAN resources are assigned more or less temporarily by the network to one or more UE devices by use of allocation tables, or more generally by use of a downlink resource assignment channel or physical downlink control channel ("PDCCH"). LTE is a packet-based system and therefore, there may not be a dedicated connection reserved for communication between a UE and the network. Users are generally scheduled on a shared channel every transmission time interval ("TTI") by a Node B or an e-Node B. A Node B or an e-Node B controls the communications between user equipment terminals in a cell served by the Node B or e-Node B. In general, one Node B or e-Node B serves each cell. Resources needed for data transfer are assigned either as one time assignments or in a persistent/semi-static way. The LTE, also referred to as 3.9G, generally supports a large number of users per cell with quasi-instantaneous access to radio resources in the active state.

The types of UEs and services the UTRAN and E-UTRAN environment can accommodate are many, including HSDPA. HSDPA is a 3G signaling protocol that allows UMTS networks and compatible UEs in the network to provide higher data transfer speeds and capacity. A UTRAN or 3G UE that supports HSDPA can transmit and receive voice and data packets contemporaneously. Data packets may include data for audio, video, web browsing, email, mobile television reception, data file transfer and other data intensive services, also including VoIP. Present HSDPA networks support data downlink speeds of 1.8, 3.6, 7.2 and 14.4 Mbits/s. Future upgrades are planned to enhance these speeds to 42 Mbits/s and higher. Typically, supported uplink speeds are lower but still are increasing and will continue to increase in future implementations.

To support HSDPA, UEs must listen to one or more shared control channels, the High Speed Shared Control Channel ("HS-SCCH"). In order to address a particular UE, the base station or other transmitter of HSDPA services will scramble a transmission on the HS-SCCH using the unique UE identification code (this operation is referred to as "UE specific masking"). When a new transmission on the HS-SCCH is received, the UE uses the same protocol, albeit in reverse order, to descramble the received packets, once again using its unique UE specific identification code. When the descrambled packet has valid data as indicated by a correct result in a cyclic redundancy check (CRC) calculation, the UE then determines that it is the receiver addressed by the transmitter in the HS-SCCH. In that case the UE may reply on a HSDPA uplink channel using acknowledge ("ACK") or not acknowledged ("NACK") messages if appropriate. In contrast, if the descrambled HS-SCCH packets do not pass the CRC check, the UE determines it is not the addressed receiver, and returns to a "listen" mode on the HS-SCCH. In this manner, a transmitter may address multiple UEs in the environment with HSDPA packets. A UE may monitor several HS-SCCH channels at a time.

The HSDPA communication is divided into sub-frames. The HS-SCCH sub-frame consists of three slots; the three slots are divided into Part 1 and Part 2. Part 1 is in the first slot, which carries time critical information needed by the receiver to demodulate and correctly receive the high speed downlink shared channel (HS-DSCH) packets that will follow. The time critical parameters of Slot 1 include modulation type, as the HSDPA supports adaptive modulation and coding using Quadrature Phase Shift Keying ("QPSK") and 16 Quadrature Amplitude Modulation ("16QAM"), for example. The two slots of Part 2 of the HS-SCCH contain parameters that are less time critical, and include a CRC field to check the validating of the HS-SCCH information.

The use of the UE specific identity information in HSDPA UE specific masking is described by the 3GPP technical specifications, for example in 3GPP TS 25.212, release 7.0, 2007-11, available from the 3GPP at www.3GPP.org, which is herein incorporated by reference.

A continuing need thus exists for methods and apparatus to efficiently perform the UE specific masking operations used in scrambling and descrambling of HS-SCCH packets to support rapid computation of the sequences needed to support the HSDPA. The methods and circuits are also applicable to other protocols with user equipment identification specific masking and scrambling and descrambling to address specified receivers. Circuitry and methods to implement these functions with efficient use of silicon area and conservation of power resources are also needed.

SUMMARY OF THE INVENTION

Embodiments of the present invention include an apparatus and methods for providing the UE specific masking sequence for transceiving scrambled packets. The packets are scrambled with a code sequence corresponding to an identity field the network has assigned to a specific receiver. The receivers in the system can then use their specific code sequence to descramble the received packets and thereby determine whether messages received are addressed to the particular receiver. In this manner, communications to receivers may be transmitted and received over shared channels. In a particular exemplary application that is not limiting but merely illustrative of the features of the invention, the embodiments and methods may be used to generate the UE specific masking sequences used for receiving HS-SCCH packets. These HS-SCCH packets may be used, in a non-limiting example, for HSDPA communications for mobile receivers and transceivers (including without limitation UEs) and base stations (including without limitation Node Bs and e-Node-Bs) supporting the HSDPA services.

According to an illustrative embodiment, an exemplary communication terminal such as a UE (typically a mobile phone or cell phone) is provided that may implement HSDPA. An efficient computation method is provided to generate a simple UE masking sequence for use in descrambling a received HS-SCCH message. In this illustrative embodiment, the rate 1/2 convolution coding and the rate matching operation are combined by determining a single matrix operation to form the UE specific masking sequence. Look up tables are formed using a combination of the 1/2 rate convolution coding and the rate matching operations to provide a fast look up of the UE specific masking sequence using only the UE specific identity to look up the resulting UE specific masking sequence.

According to another illustrative embodiment, a communication terminal such as a UE is provided that may include a receiver for receiving, from a transmitter, a HS-SCCH packet. Two look up tables are provided, each indexed by one half of the UE specific identity field, to look up a portion of the resulting masking sequence. A simple combining computation may be performed on the two portions to complete the method of determining the UE specific masking sequence.

According to another illustrative embodiment, a communication terminal such as a UE is provided that may include a receiver, for receiving a HS-SCCH packet. A simple matrix operation is performed using the UE specific identity and a pre-determined matrix as inputs. The matrix is determined by examining the particular generator polynomials and the rate matching pattern in advance from the protocol. For a non limiting example, a protocol in the 3GPP 25.212 specification is used. Performing the matrix operation results in the UE specific masking sequence. Thus, the rate 1/2 convolution coding and rate matching operations required to produce the UE masking sequence are combined into a single, simple matrix computation with a small stored number of matrix entries.

According to another illustrative embodiment, a communication terminal such as a UE is provided that may include a receiver, for receiving a HS-SCCH packet. A simple matrix operation is performed using the UE specific identity as an input, a matrix determined by particular generator polynomials and rate matching operations as determined in advance from the 3GPP 25.212 specification as an input and further, the matrix is subjected to data compression to eliminate unneeded data bits. A simple matrix multiplication is performed and the method finishes by outputting the UE masking sequence. Thus, the rate 1/2 convolution coding and rate matching operations required to produce the UE masking sequence are combined into a single computation with a small stored number of matrix entries, the matrix entries stored being further optimized by data compression.

According to another illustrative embodiment, a communication terminal such as a UE is provided that may include a receiver receiving a HS-SCCH packet. A simple matrix operation is performed using the UE specific identity as an input, a matrix determined by particular generator polynomials determined in advance as an input, and outputting the UE masking sequence. In this illustrative embodiment, the matrix operation is performed as a simple bit wise exclusive OR operation. Thus, the rate 1/2 convolution coding and rate matching operations required to produce the UE masking sequence are combined into a single, simple computation with a small stored number of matrix entries.

According to another illustrative embodiment, a communication terminal such as a UE is provided that may include a receiver, for receiving from a transmitter, and a HS-SCCH packet. A simple matrix operation is performed using the UE specific identity as an input, a matrix determined by particular generator polynomials determined in advance from the 3GPP 25.212 specification as an input, and further subjected to data compression to eliminate unneeded data bits, and outputting the UE masking sequence. The matrix operation is performed as a simple bit wise exclusive OR operation. Thus, the rate 1/2 convolution coding and rate matching operations required to produce the UE masking sequence are combined into a single, simple computation with a small stored number of matrix entries, the matrix stored being further optimized by data compression.

According to another illustrative embodiment, a method for performing the UE masking sequence in a HSDPA compatible communication terminal such as a UE is provided that may receive a HS-SCCH packet. In this method, a look up table is formed by storing the entries required to output the UE masking sequence specified by the protocols of the 3GPP 25.212 specification for each possible combination of UE specific identity bits. A retrieval operation is performed using the UE specific identity as an address to obtain the UE masking sequence for use in descrambling a received HS-SCCH packet.

In another illustrative embodiment, a computer readable medium may be provided with instructions that cause a programmable processor to perform a matrix calculation on a user equipment identity field to output a user equipment specific masking sequence, the matrix calculation including determining the entries for a multiplication matrix from a pair of protocol specific polynomials and a bit rate puncturing pattern, storing the multiplication matrix and using the bits from the user equipment identity field to retrieve entries from the stored multiplication matrix to perform repeated matrix calculations to generate the masking sequence.

In illustrative embodiments, a user equipment identity field of 16 bits in length is used in a method to generate a user equipment specific masking sequence of 40 bits in length, the user equipment specific masking sequence being determined by a 1/2 rate convolutional encoding and a bit rate matching puncturing pattern, the method comprising a single computation with a stored matrix.

According to another illustrative method embodiment, a method for generating the UE masking sequence is provided. A pair of look up tables is formed using protocol specified generator polynomial and rate matching or puncturing information, each table containing a portion of the masking sequences. Each table provides a portion of the masking sequence corresponding to a portion, such as one half, of the UE specific identity field. When the masking sequence is needed, a retrieval operation is performed in each of the two tables using the corresponding portion of the UE specific identity field to address each table. The resulting retrieved masking sequence information from each table is then combined to form the UE specific masking sequence.

In an alternate illustrative embodiment, a communications device may include a processor, a storage containing a stored multiplication matrix for generating a user equipment specific masking sequence from a user equipment identity field, and a stored user equipment identity field. In another illustrative embodiment, the stored matrix may have 16 rows of 40 bit entries and the user identity field may be 16 bits in length.

In another illustrative embodiment, an apparatus is formed for generating a UE specific masking sequence comprising: means for providing a specific identity field; means for storing information corresponding to a convolutional encoding and rate matching operation defined by a communications protocol; means for retrieving the stored information; means for performing an operation on the specific identity field using the retrieved information; and means for generating the UE specific masking sequence using the results of the operation. In a further illustrative embodiment of this apparatus, the means for storing information is a means for implementing at least one look up table. In a further alternate illustrative embodiment of this apparatus, the means for storing information is a means for implementing a stored multiplication matrix.

In another illustrative embodiment, an apparatus is formed for generating a UE specific masking sequence comprising means for providing a specific identity field, means for storing information corresponding to a convolutional encoding and rate matching operation defined by a communications protocol, means for retrieving the stored information, means for performing an operation on the specific identity field using the retrieved stored information, and means for generating the UE specific masking sequence using the output of the operation. In a further illustrative embodiment of this apparatus, the means for storing information is a means for implementing a look up table. In a further alternate illustrative embodiment of this apparatus, the means for storing information is a means for implementing a stored multiplication matrix. In a further illustrative embodiment of this apparatus, the means for providing a specific identity field, means for storing, means for retrieving, means for operating and means for generating reside in a single integrated circuit.

In an alternate embodiment, a receiver or transmitter may be implemented as an integrated circuit comprising a processor, a storage containing a stored multiplication matrix for generating a user equipment specific sequence from a user equipment identity field, and a stored user equipment identity field. In another illustrative embodiment; the stored matrix may have 16 rows of 40 bit entries and the user identity field may be 16 bits in length.

In a further alternate embodiment, the receiver or transmitter may be implemented as an integrated circuit comprising a processor, a storage containing a stored multiplication matrix for generating a user equipment specific sequence from a user equipment identity field, a stored user equipment identity field, and program storage storing instructions that, when executed by the processor, cause the user equipment integrated circuit to generate a user equipment specific masking sequence by a single matrix computation retrieving the stored multiplication matrix and retrieving the user equipment identity field, and performing matrix multiplication operations to form the masking sequence.

Any of the embodiments described above may be advantageously used to generate UE specific masking sequences for scrambling and descrambling shared channel communications. The embodiments are useful in receivers, transmitters, or transceivers that communicate over the shared channel.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conceptions and specific embodiments disclosed may be readily utilized as a basis for modifying or designing other structures or processes for the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, reference is now made to the following descriptions taken in conjunction with the accompanying drawing, in which:

FIG. 8 illustrates a code portion for performing an algorithm for an illustrative embodiment of the present invention;

FIG. 11 depicts an illustrative embodiment of one form of a multiplication matrix used to generate the user equipment specific masking sequence;

FIG. 12 depicts an illustrative code segment embodiment of one algorithm used with the matrix of FIG. 11 to generate the user equipment specific masking sequence;

FIG. 13 depicts an illustrative alternative code segment embodiment and a matrix embodiment of one algorithm used to generate the user equipment specific masking sequence;

FIG. 14 depicts yet another illustrative alternative code segment embodiment and a matrix embodiment of one algorithm used to generate the user equipment specific masking sequence.

DETAILED DESCRIPTION

Figure 1:
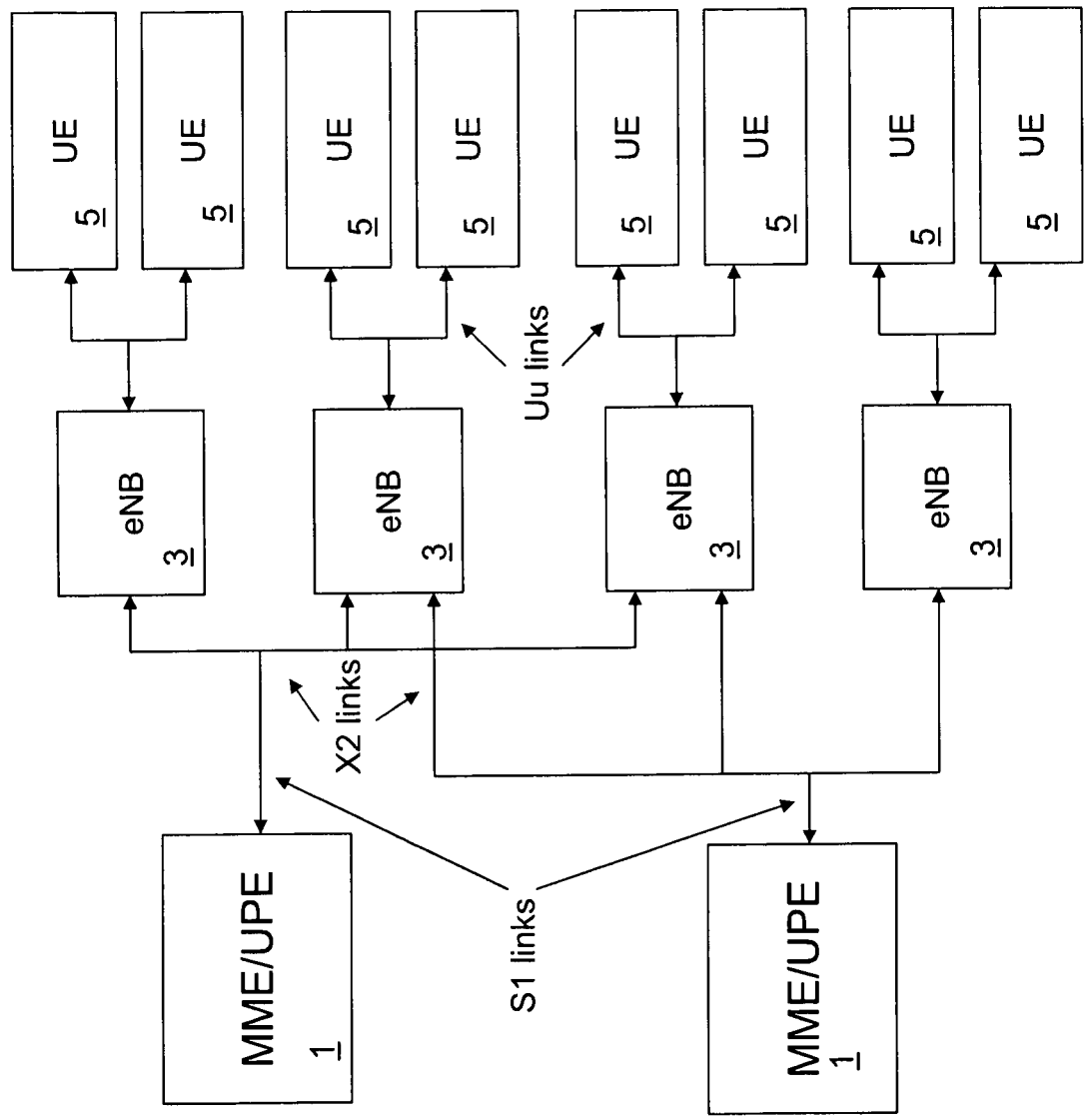
FIG. 1 illustrates a communications system according to one exemplary embodiment of the present invention.

Referring initially to FIG. 1, illustrated is a system level diagram of a radio frequency interface communication system including a wireless or air interface (AI) communication system that provides in one non-limiting example, an illustrative environment for the application of the principles of the present invention. The wireless communication system may be configured to provide features included in the E-UTRAN services. Mobile management entities ("MMEs") 1 and user plane entities ("UPEs") provide control functionality for one or more eNBs 3 (alternatively referred to as base stations) via an S1 interface or communication link. The base stations 3 communicate via an X2 interface or communication link. The various communication links are typically fiber, microwave, or other high-frequency metallic communication paths such as coaxial links, or combinations thereof.

The base stations 3 communicate over the AI with user equipment 5 (designated "UE"), each of which is typically a mobile transceiver carried by a user. Alternatively, the user equipment may be a mobile web browser, text messaging appliance, a laptop with a mobile PC modem, or other user device configured for cellular or mobile services. Thus, communication links (designated "Uu" communication links) coupling the base stations 3 to the UEs 5 are AI links employing a wireless communication signal. For example, the devices may communicate using a known signaling approach such as a 1.8 GHz orthogonal frequency division multiplex ("OFDM") signal. Other radio frequency signals may be used. Of particular interest here are AI communications using HSDPA protocols for transmitting and receiving high speed packetized data.

Figure 2:
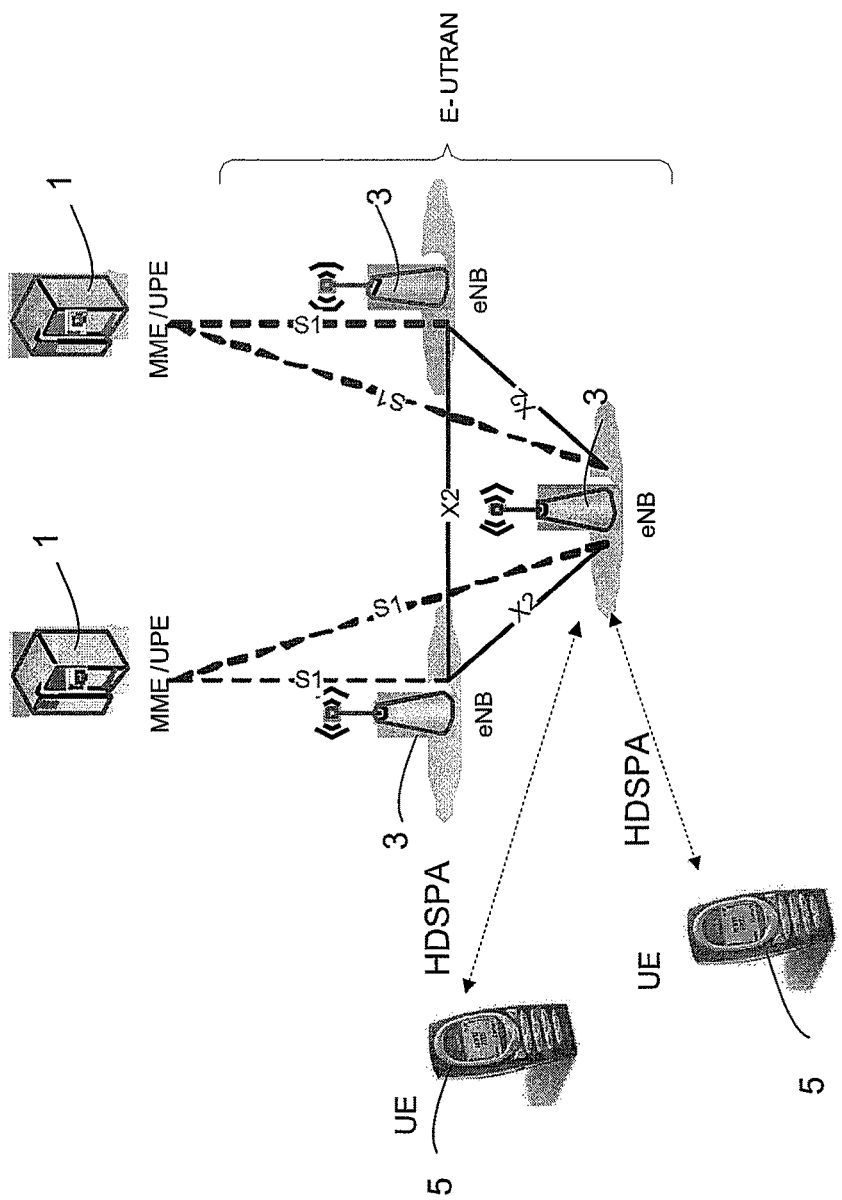
FIG. 2 illustrates user equipment communicating to an eNode B over an air interface, and an E-UTRAN communications system according to another exemplary embodiment of the present invention.

FIG. 2 illustrates in a system level diagram a communication system including a wireless communication system that provides in another non-limiting example, an illustrative environment for the application of the principles of the present invention. The wireless communication system provides an E-UTRAN architecture including base stations 3 providing E-UTRAN user plane (packet data convergence protocol/radio link control/media access control/physical transport) and control plane (radio resource control) protocol terminations directed towards UEs 5, these example UEs support HSDPA communications, as do the eNBs 3. The base stations 3 are interconnected with an X2 interface or communication link. The base stations 3 are also connected by an S1 interface or communication link to an evolved packet core ("EPC") including, for instance, a mobility management entity ("MME") and a user plane entity ("UPE") 1, which may form an aGW. The S1 interface supports a multiple entity relationship between the mobility management entities/user plane entities and the base stations and supports a functional split between the mobility management entities and the user plane entities.

The base stations 3 may host functions such as radio resource management. For example, they may host internet protocol ("IP"), header compression and encryption of user data streams, ciphering of user data streams, radio bearer control, radio admission control, connection mobility control, and dynamic allocation of resources to user equipment in both the uplink and the downlink. The base stations may also perform functions such as, without limitation, selection of a mobility management entity at the user equipment attachment, routing of user plane data towards the user plane entity, scheduling and transmission of paging messages (originated from the mobility management entity 1), scheduling and transmission of broadcast information (originated from the mobility management entity or operations and maintenance), and measurement and reporting configuration for mobility and scheduling. The mobility management entity/user plane entity 1 may host functions such as distribution of paging messages to the base stations, security control, terminating user plane ("U-plane") packets for paging reasons, switching of U-plane for support of the user equipment mobility, idle state mobility control, and system architecture evolution bearer control. The user equipment receives a set of a group of information blocks from the base stations.

Figure 3:
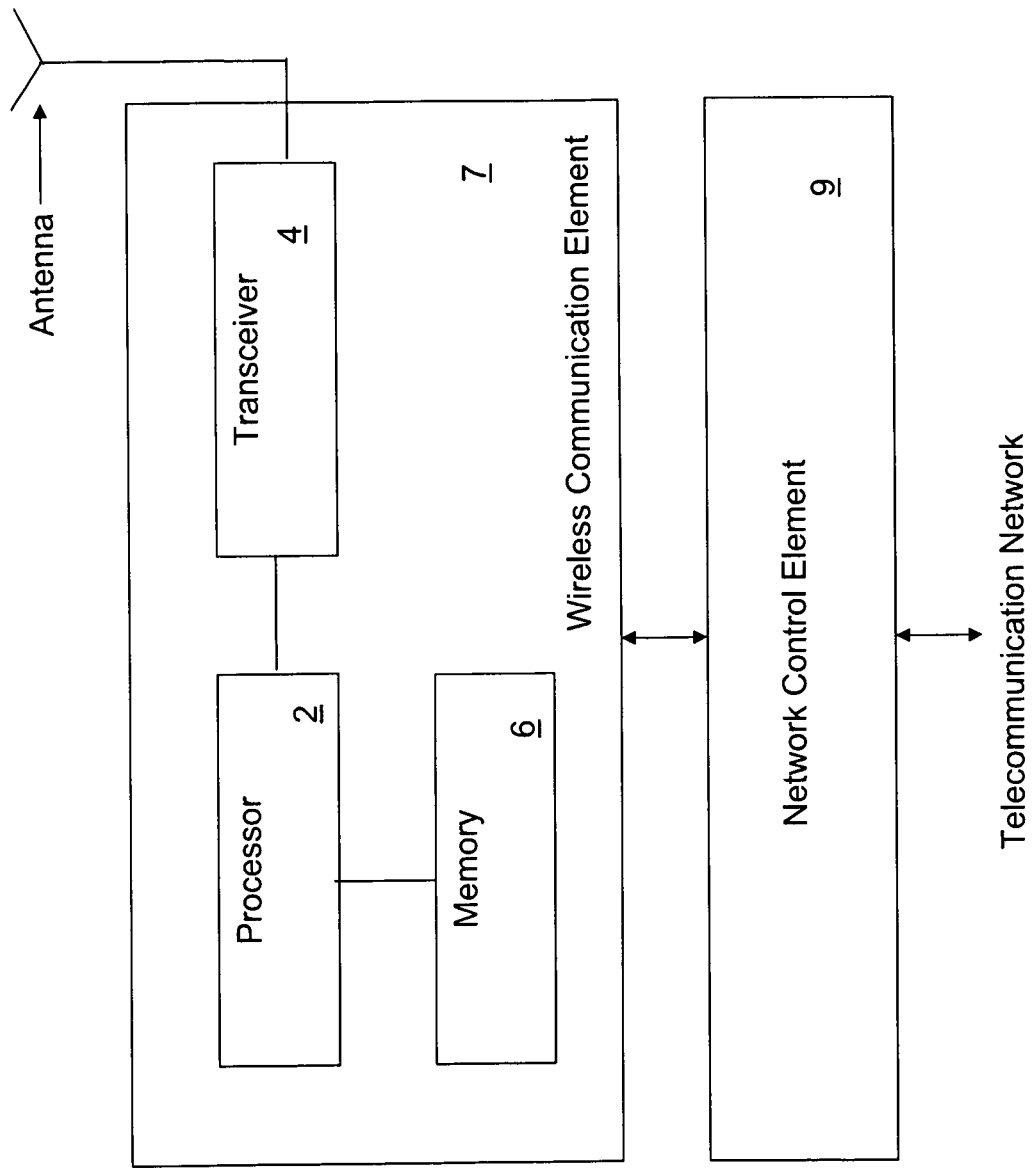
FIG. 3 illustrates a block diagram of a communication terminal according to another exemplary embodiment of the present invention.

FIG. 3 illustrates a simplified system level diagram of an example communication element of a communication system that provides an environment and structure for application of the principles of the present invention. The communication element 7 may represent, without limitation, an apparatus including a base station or NB, or a UE such as a terminal or mobile station. The communication element includes, at least, a processor 2, a memory 6 that stores programs and data of a temporary or more permanent nature, an antenna, and a radio frequency transceiver 4 coupled to the antenna and the processor for bidirectional wireless communication. Other functions may also be provided. The communication element may provide point-to-point and/or point-to-multipoint communication services.

The communication element 7, such as a base station in a cellular network, may be coupled to a network element 9, such as a network control element of a public switched telecommunication network. The network control element 9 may, in turn, be formed with a processor, memory, and other electronic elements (not shown). The network control element 9 generally provides access to a telecommunication network such as a public switched telecommunication network ("PSTN"). Access may be provided using fiber optic, coaxial, twisted pair, microwave communication, or similar communication links coupled to an appropriate link-terminating element. A communication element 7 formed as a mobile station is generally a self-contained device intended to be carried by an end user; however in some areas, the mobile station may be permanently installed at a fixed location as well.

The processor 2 in the communication element 7, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, traffic management, performance data analysis, tracking of end users and mobile stations, configuration management, end user administration, management of the mobile station, management of tariffs, subscriptions, billing, and the like. The execution of all or portions of particular functions or processes related to management of resources may be performed in equipment separate from and/or coupled to the communication element, with the results of such functions or processes communicated for execution to the communication element. The processor 2 of the communication element may be of any type suitable to the local application environment, and may include one or more of general-purpose computers, special-purpose computers, microprocessors, digital signal processors ("DSPs"), and processors based on a multi-core processor architecture, as non-limiting examples.

The transceiver 4 of the communication element 7 modulates information onto a carrier waveform for transmission by the communication element via the antenna to another communication element. The transceiver 4 demodulates information received via the antenna for further processing by other communication elements.

The memory 6 of the communication element 7, as introduced above, may be of any type suitable to the local application environment, and may be implemented using any suitable volatile or non-volatile data storage technology, such as a semiconductor-based memory device, a magnetic memory device and system, an optical memory device and system, fixed memory, and removable memory. The programs stored in the memory 6 may include program instructions that, when executed by an associated processor 2, enable the communication element 7 to perform tasks as described herein. Exemplary embodiments of the system, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element 7 as illustrated and described above.

Figure 4:
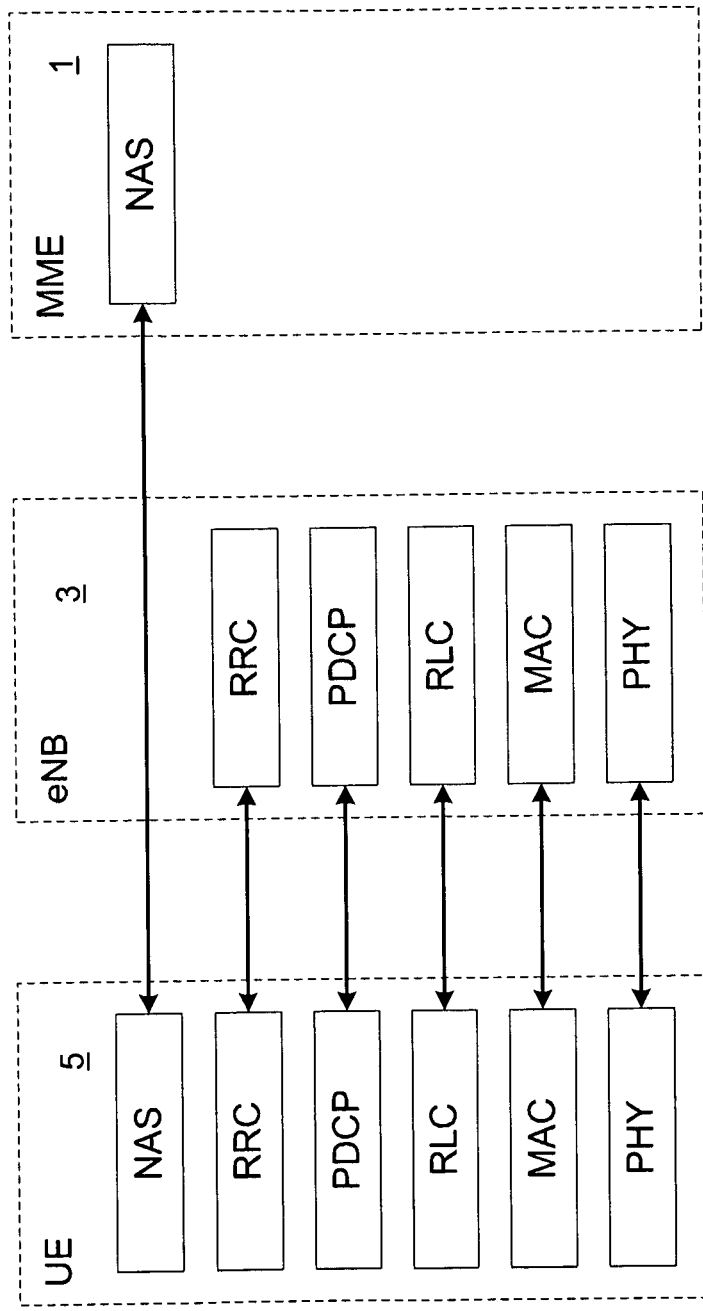
FIG. 4 illustrates communication layers of a UE, eNB and MME according to another exemplary embodiment of the present invention.

FIG. 4 depicts a block diagram of an embodiment of user equipment 5 and a base station 3 constructed according to the principles of the present invention. The user equipment UE 5 and the base station eNB 3 each include a variety of layers and subsystems: the physical layer ("PHY") subsystem, a medium access control layer ("MAC") subsystem, a radio link control layer ("RLC") subsystem, a packet data convergence protocol layer ("PDCP") subsystem, and a radio resource control layer ("RRC") subsystem. Additionally, the user equipment 5 and the mobile management entity ("MME") 1 include a non-access stratum ("NAS") subsystem.

The physical layer subsystem supports the physical transport of packets over the LTE air interface and provides, as non-limiting examples, CRC insertion (e.g., a 24 bit CRC is a baseline for physical downlink shared channel ("PDSCH")), channel coding, HARQ processing, and channel interleaving. The physical layer subsystem also performs scrambling such as transport-channel specific scrambling on a downlink-shared channel ("DL-SCH"), broadcast channel ("BCH") and paging channel ("PCH"), as well as closed multicast channel ("MCH") scrambling for all cells involved in a specific multimedia broadcast multicast service single frequency network ("MBSFN") transmission. The physical layer subsystem also performs signal modulation such as QPSK, 16 QAM and 64 QAM, layer mapping and pre-coding, and mapping to assigned resources and antenna ports. The media access layer or MAC performs the HARQ functionality and other important functions between the logical transport layer, or Level 2, and the physical transport layer, or Level 1. In addition, in a HSDPA protocol capable communication system, the physical layer supports channels including HS-SCCH, HS-DSCH downlink channels with adaptive modulation and coding, HSUPA uplink channels, and HARQ for HSDPA transmissions.

Each layer is implemented in the system and may be implemented in a variety of ways. A layer such as the PHY in the UE 5 may be implemented using hardware, software, programmable hardware, firmware, or a combination of these as is known in the art. Programmable devices such as DSPs, reduced instruction set ("RISC"), complex instruction set ("CISC"), microprocessors, microcontrollers, and the like may be used to perform the functions of a layer. Reusable design cores or macros as are provided by vendors as ASIC library functions, for example, may be created to provide some or all of the functions and these may be qualified with various semiconductor foundry providers to make design of new UEs, or eNode B implementations, faster and easier to perform in the design and commercial production of new devices.

Approaches to generating the UE specific masking sequence used in scrambling (for transmitting) and descrambling (for receiving) Part 1 of the HS-SCCH are known. U.S. Pat. No. 6,973,579, entitled "Generation of User Equipment Identification Specific Scrambling Code for the High Speed Shared Control Channel", to Dick et al., issued Dec. 6, 2005, is hereby incorporated by reference.

Published U.S. Patent Application No. US2005/0232214A1, entitled "Identical Puncturing of UE Identification Data and Load Data in the HS-SCCH Channel", to Dottling, et al. published Oct. 20, 2005, is hereby incorporated by reference.

Illustrative embodiments of the present invention will now be described. In these embodiments, the rate 1/2 convolution coding and the rate matching operations for generating the UE specific masking sequence are combined into a single, predetermined matrix operation. By efficiently storing the required matrix coefficients, the circuits and methods of the illustrative embodiments may provide a silicon and power efficient solution to the generation of the UE masking sequence. In this document, most of the exemplary embodiments will be described in terms of a mobile station or UE, as that application requires the most efficient circuitry. However, the transmitter function, which may be located in a base station or eNB, may also be improved by use of the methods and circuits described herein as indicated by the description below and those embodiments are part of the invention and are contemplated as well.

In order to better understand the specific workings of the embodiments, the matrix information required is first described. In the particular exemplary illustrative application to the HS-SCCH channel, the 3GPP technical specification 25.212 release 7.0 incorporated above provides, at Section 4.6.7, the UE specific masking for the HS-SCCH protocol. The technical specification states that 40 rate matched bits input to the masking operation are masked to output a 40 bit scrambled output. An intermediate code word of 48 bits in length is to be defined using the 16 UE identity bits using a rate 1/2 convolution coding operation as described at Section 4.2.3.1. Eight bits of the 48 bits are to be punctured using the rate matching rule described at Section 4.6.7., bits 1, 2, 4, 8, 42, 45, 47 and 48 are punctured; the resulting 40 bit UE specific scrambling sequence is applied to the input 40 bits and a scrambled 40 bit output is provided.

Figure 5:
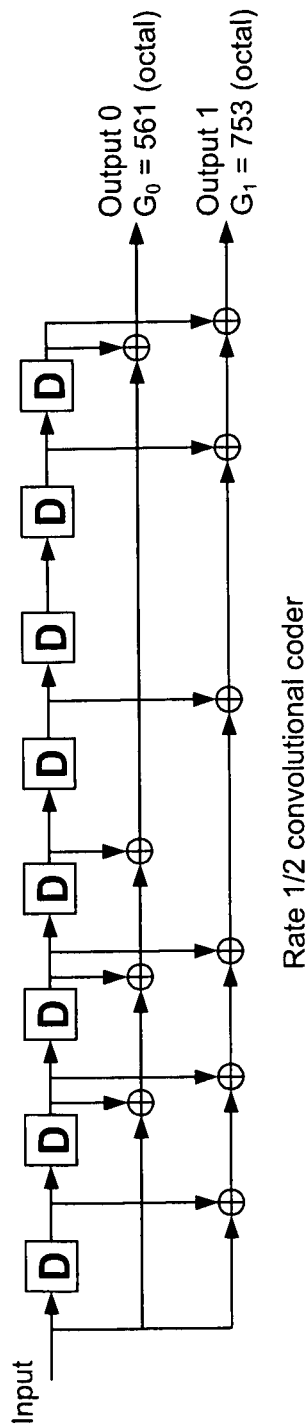
FIG. 5 illustrates the rate 1/2 convolutional encoder scheme and the G0 and G1 polynomials used to perform the user equipment specific masking sequence operations for HS-SCCH communications.

FIG. 5 depicts the rate 1/2 convolutional encoder of Section 4.2.3.1 of the technical specification, which is identified as a component of the UE specific masking scheme in paragraph 4.6.7 of the technical specification. Section 4.2.3.1. further explains that the field is to be lengthened by the insertion of 8 zero tail bits prior to the convolution coding. Thus, the 16 bit UE specific identity field is extended by 8 bits to form a 24 bit input sequence. The UE identity field may be provided, for example, by the network to the UE each time the HSPDA channel is initially set up, or reconfigured, through higher layer services. The delay elements D in the encoder of FIG. 5 feed the input data in from left to right, starting with bit 1. Section 4.2.3.1. further provides that the output sequence is formed by taking output 0, output 1 in an alternating fashion of bit pairs. Thus, for a 24 bit input sequence, 48 bits will be output.

The UE specific masking section, Section 4.6.7, then provides that the intermediate code word of 48 bits will be punctured, or rate matching will be performed, to result in a 40 bit sequence by puncturing bits 1, 2, 4, 8, 42, 45, 47 and 48.

Figure 6:
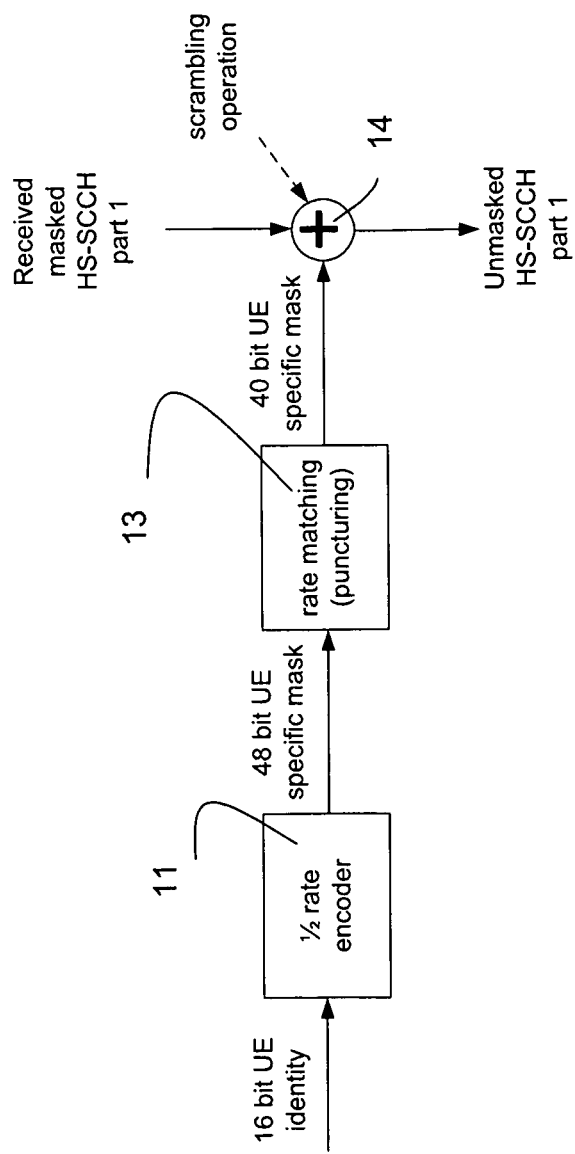
FIG. 6 illustrates in a simple block diagram an example of the conventional operations used to receive unmasked HS-SCCH communications.

FIG. 6 then depicts in a simplified block diagram the operations described to generate a 40 bit UE specific masking sequence from a 16 bit UE identity field as used in a receiver application. A 16 bit UE field is input into the 1/2 rate encoder 11 which performs the convolution coding using polynomials G0, G1 as shown in FIG. 5. Prior to the input to the convolutional encoder 11, 8 tail bits are inserted to extend the field to 24 bits in length. An intermediate result 48 bit mask is output by encoder 11. Rate matching operation 13 is then performed by puncturing the specified 8 bits. These bits are removed from the sequence to rate match with the 40 bit length of the received HS-SCCH part 1. The received masked packet is unmasked by a scrambling operation 14 (typically, an exclusive OR as shown; other operations could be used) to result in the received HS-SCCH part 1 which is then forwarded for further processing by the receiver.

In one illustrative embodiment, a simple approach to combining the encoding operation 11 and the rate matching operation 13 of FIG. 6 is applied. As can be seen from FIG. 5, the 40 bit UE specific mask is a unique sequence that corresponds to the 16 bit input field UE identity. One illustrative embodiment for combining steps and therefore making an efficient computation of the UE specific mask would be to populate a look up table with each of the possible values of the UE specific mask, addressed by the 16 bit UE identity field.

A look up table for this exemplary embodiment requires 256*40 bits, or 65536*48 bits (using normal memory array boundary)=192k words, where a word=2*8 bit wide bytes, or 16 bits. In exemplary semiconductor process technology, this array is believed to be quite large and although this approach will provide a simple method for generating the UE specific masking sequence, further optimization is desirable.

Figure 7:
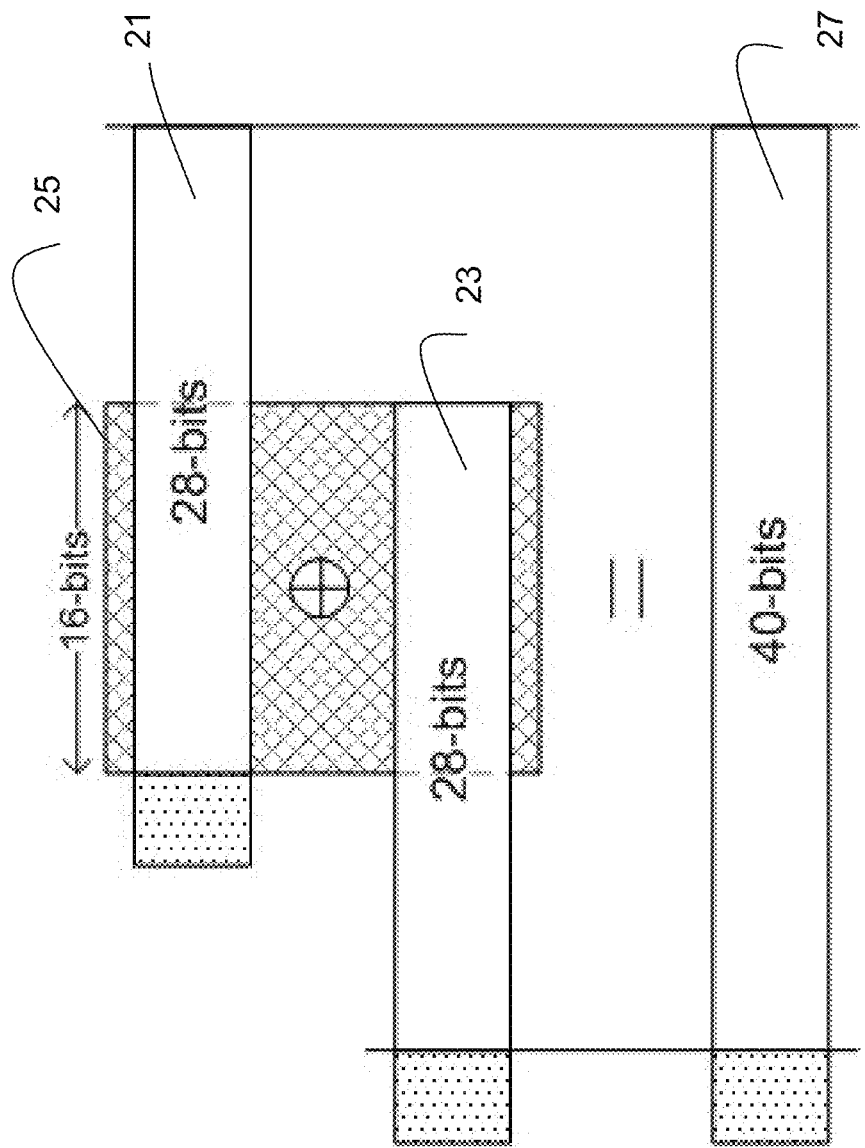
FIG. 7 illustrates an exemplary embodiment for performing the user equipment specific masking sequence operations of the present invention using a pair of look up table entries and a combining operation.

In another illustrative embodiment, an optimized look up table approach is used. FIG. 7 depicts graphically the use of the outputs of two look up tables to obtain a 40 bit UE specific masking sequence. In FIG. 7, a first 28 bit intermediate output 21 is obtained from a 16 bit input using a look up table built by applying the 1/2 rate convolution coding of FIG. 5 applied to the lower 8 bits of the 16 bit UE identity field extended by 8 tail bits. The convolution coding encoder operates to form 32 bit sequences which are then punctured by 4 bits to obtain the 28 bit wide table. Similarly, a second 28 bit intermediate output 23 is obtained by a look up operation on a second look up table. The entries of the second table are built by applying the 1/2 rate convolutional encoding to the upper 8 bits of the 16 bit UE specific identity field, extended by 8 tail bits. The resulting 32 bit outputs are then punctured by the remaining 4 puncture bits to obtain table entries of 28 bits. The two table outputs 23 and 21 are then combined by combining the overlapping portions of the two look up table outputs using an exclusive OR operation 25 on the overlapping 16 bits in order to obtain the 40 bits of the UE specific masking sequence 27.

FIG. 8 depicts in code form the operations that could be used in conjunction with the two look up tables to form the 40 bit wide UE specific masking sequence, corresponding to the 16 bit UE identity field. This field is sometimes referred to as the HS-DPCH Radio Telephone Network Identifier ("HRNTI"), and in FIG. 8 the exemplary code outputs a field called *hrnti_40_output which is the UE specific masking sequence. The code uses as inputs two look up tables each having 256 entries of 28 bits width. The input address is hrnti_16_input>>8 for table 1, that is the upper bits of the ULE specific identity field or HRNTI, and for table 2 the table is addressed by the lower 8 bits, given by the masking operation of the field hrnti_16_input ANDED with the value FF in hexadecimal. The resulting table values are then aligned so that the overlapping 16 bits, the upper 16 bits from table 1 and the lower 16 bits from table 2, may be combined by an exclusive OR operation. Then the 40 bit output word *hrnti_40_output is constructed of the upper bits of Table 1, the 16 bit XOR output, and the lower bits of Table 2 to form the needed 40 bit UL specific masking sequence.

The memory requirements for the two look up tables in this exemplary embodiment could be much smaller than the first illustrative embodiment described above. Two tables of $2^8$*28 bits are required, rounding the word width up to 32 bits (the normal memory array boundary) results in a requirement of 1024 words, or 1K memory words (assuming words have 16 bit lengths). The table calculations are done before the UE is built and are fixed in value so relatively dense technologies may be used to store the table words and so this approach may be relatively silicon efficient. The lookup and XOR operations of the method described in the code shown in FIG. 8 may be, for example, performed by a processor using software or in a hardware state machine approach.

Figure 9:
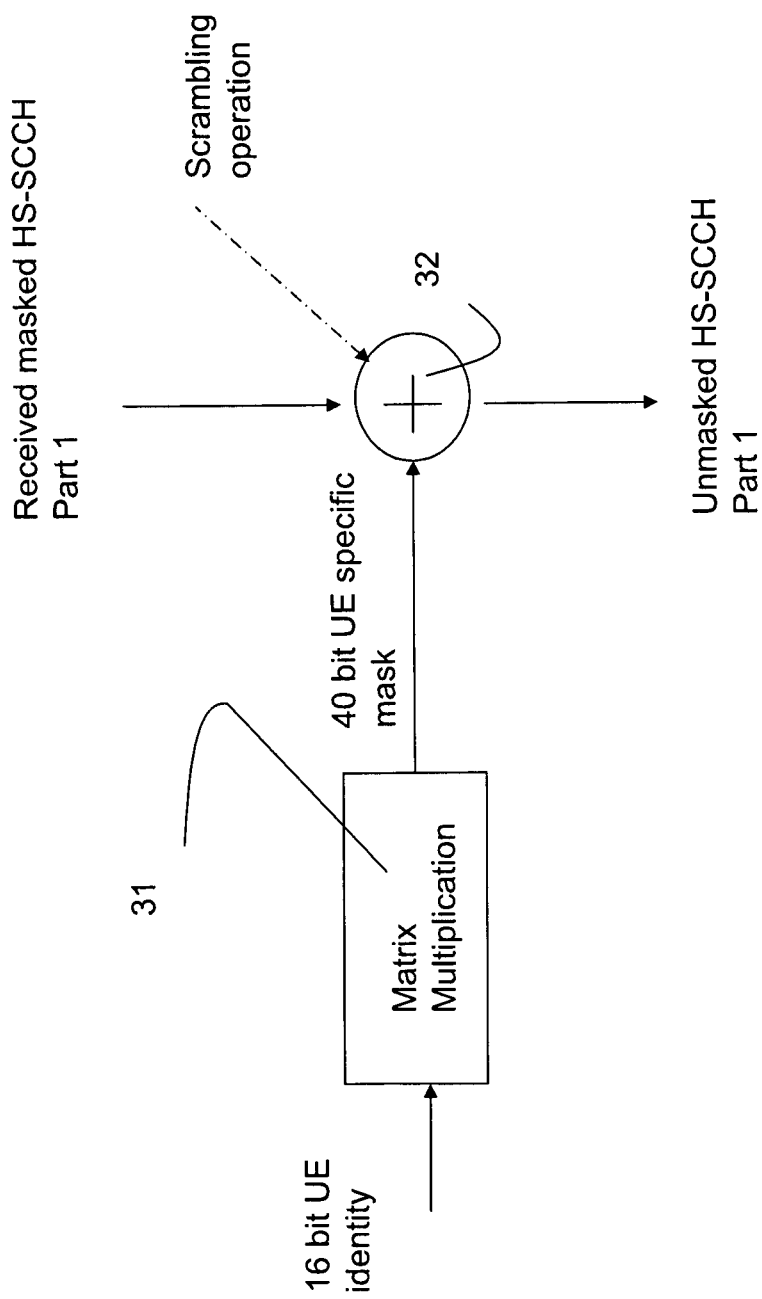
FIG. 9 depicts in simple block diagram a receiver for generating unmasked HS-SCCH communications incorporating features of embodiments of the present invention.

FIG. 9 illustrates another method embodiment that generates the required UE specific masking sequence. In FIG. 9, the UE specific mask required to perform the scrambling operation 32, for example in a receiver UE, is obtained directly from the 16 bit UE identity using a matrix multiplication operation 31.

The method used in FIG. 9 may be described as an algorithm:

Input_word*G_matrix=Output_word

Where: the Input_word is the 16 bit UE identity field or HRNTI field;
the G_matrix is a 16 by 40 bit matrix;
the * operator is a GF(2) matrix multiplication;
the Output_word is the UE specific masking sequence.

Using this approach, the conversion from the UE identity to the UE specific masking sequence is a straightforward matrix multiplication. In the 3GPP protocols for the HS-SCCH, this may be a bit by bit exclusive OR operation. Other methods could be used.

The illustrative embodiment of FIG. 9 requires that a G matrix for use in matrix multiplication 31 be determined. This matrix provides which of the 16 input bits from the UE identity field need to be exclusively ORed together to produce each of the 40 bits of the output sequence. The information required to form this matrix may be obtained from the polynomials G0, G1 in paragraph 4.2.3.1 of the 3GPP technical specification 25.212, release 7.0. The rate matching or puncturing operation must also be applied to obtain the final entries for the matrix. Scrambling operation 32 then uses the resulting UE specific mask to descramble the received masked HS-SCCH Part 1, and outputs the unmasked HS-SCCH Part 1.

Figure 10:
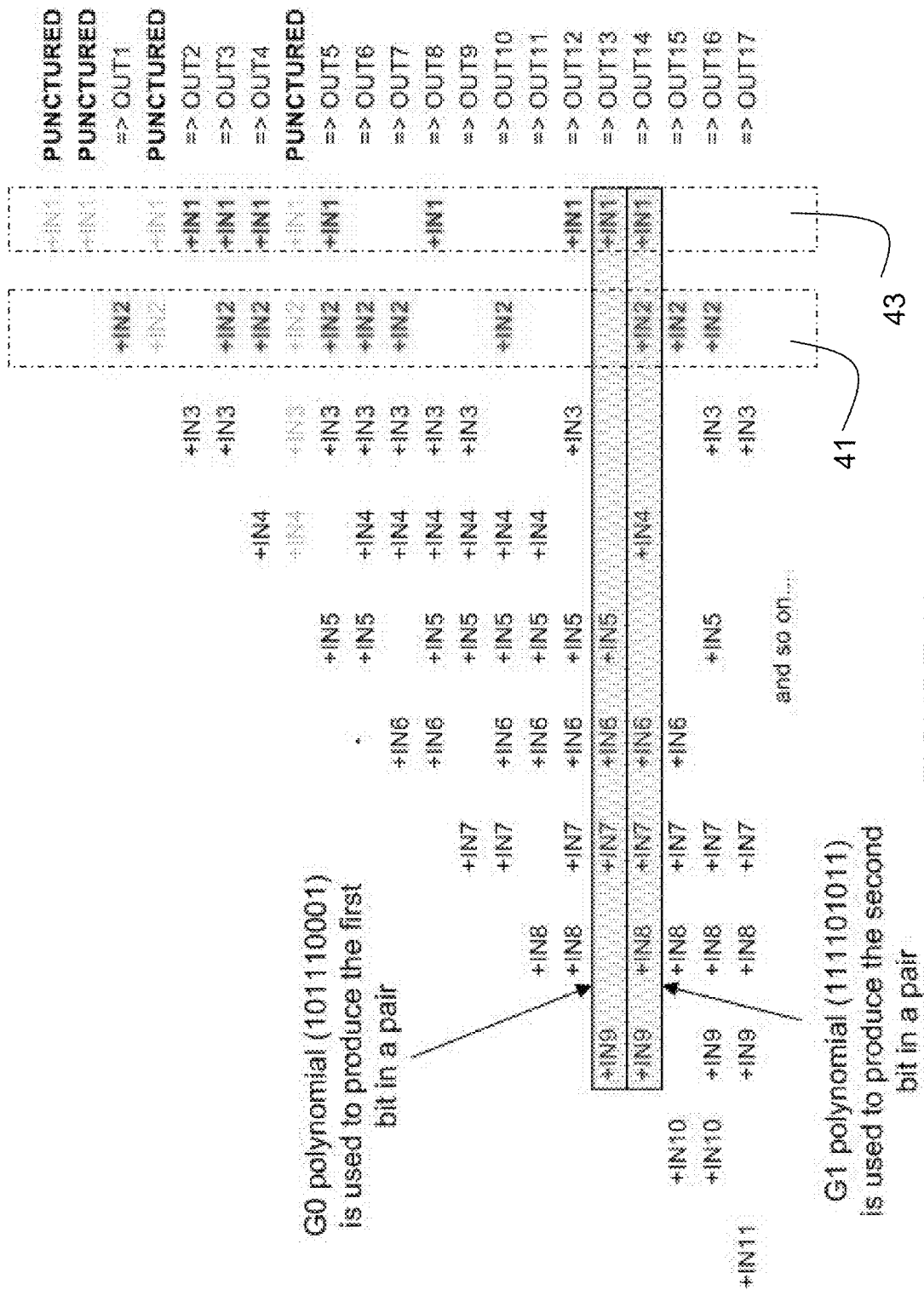
FIG. 10 depicts a table used to form the multiplication matrix used with another exemplary embodiment of the user equipment specific masking sequence.

FIG. 10 depicts graphically how two rows of the 16 row G matrix are formed. The field labeled OUT in the right hand column is building the output signal that will be 40 bits. The word PUNCTURED in a row means that the bit that was originally one of the 48 bits in the 1/2 rate convolution coding in that position is removed by the rate matching operation. The bits will then be renumbered above that PUNCTURED location. Recall that the rate matching protocol requires that bits 1, 2, 4, 8, 42, 45, 47 and 48 be punctured, so the first two entries of the OUT column are the first two output bits of the original 48 bits, and they are removed so the third bit becomes OUT1.

Column 43 of FIG. 10 shows the first row of the 16 row 40 bit wide G matrix being formed. The inputs corresponding to rows where the IN1 bit is one of the bits to be exclusive ORed to form the output are depicted with the word +IN1 entered in that row. If the bit is used in the final OUT field, it is in BOLD; if the bit is PUNCTURED it is grayed out. The determination of which OUT fields correspond to an input bit is made by applying the G0, G1 polynomials of the 1/2 rate convolution coding of the 3GPP 25.212 technical specification as shown. For the row corresponding to OUT13, the entire G0 polynomial of 9 bits, 101110001, is applied. This means that the entries for that row are +IN9, +IN7, +IN6, +IN5, +IN1, inputs that correspond to "1"s in polynomial G0. Recall that for every other row, the other G polynomial is used so that the OUT fields are formed in alternating bit pairs. For the row that results in OUT 14, polynomial G1 applies, so applying the bits "111101011" to the 9 input bits that have been shifted in at this point, the row has entries for +IN9, +IN8, +IN7, +IN6, +IN4, +IN2, +IN1.

These operations will continue until all 16 rows of 40 bits are developed. Now, the columns of the table may be used to determine the entries in the G matrix that correspond to the pattern of exclusive OR of the input bits to generate each output OUT. For the first row, box 43 surrounds the entries. Remembering the PUNCTURED rows are not in the matrix, and starting with OUT16 as the MSB, the column 43 may be written as 0011100010011110 in binary. Although only a portion of the table needed for all 40 output rows OUT is depicted in FIG. 10, the remaining entries for column 43 are all zero, so it may be written as 0000000000000000000000000011100010011110 in binary (40 bits), or 00000389E in hexadecimal.

The matrix entry for column 41 in the figure may be written as 1110001001111101 for the lower 16 bits, with zeros for the remaining MSBs, or 00000E27D in hexadecimal.

In this manner, the matrix G may be determined solely from the polynomials G0, G1 and the rate matching puncturing pattern. Each entry is a column in the table, and results in a row in the G matrix. The finished G matrix is depicted in FIG. 11 in hexadecimal, with row 1 at the top.

FIG. 12 depicts, in simplified pseudo-code format, a simple algorithm for using the G matrix labeled "gmatrix" in FIG. 11 to generate the UE specific masking sequence needed. In FIG. 12, the algorithm begins with a 40 bit field labeled ue_mask_40_bits set to zero. A test variable is set to a "1". A loop counter from 1 to 16 begins. An "if" statement uses the UE specific ID bit to determine whether that particular ID bit is set, if so, the UE mask ue_mask_40_bits are exclusively ORed with the appropriate row of the G matrix (FIG. 11) that is indexed by the loop counter. The loop continues for all 16 bits of the UE identity field and the 40 bit UE specific masking sequence is then computed.

The matrix G of FIG. 11 can be stored easily in silicon implementations as it is quite small, only 16 40 bit entries. This is 16*40=640 bits, or using the usual 16 bit memory array boundary, simply 48 words.

FIG. 13 depicts an actual code sequence that may be used to compute the 40 bit UE specific masking sequence. In this method the G matrix is reordered in reverse order, here labeled "const unit40 gmatrix", from the exemplary G matrix shown in FIG. 11. The code performs the same operations discussed above for FIG. 12 and so is not further described here.

FIG. 14 depicts another exemplary matrix for use in generating the UE specific masking sequence. In FIG. 14, the 40 bit matrix of FIG. 11 is further optimized by using a data compression technique to eliminate unneeded bits. Now, the optimized G matrix, labeled "const uint32 gmatrix" may be stored using only 32 bit wide entries.

FIG. 14 also depicts actual code that implements an algorithm for computing the UE specific masking sequence (labeled *hrnti_40_output) from the 32 bit wide matrix shown. Again, a loop is formed and for each of the 16 input bits that is evaluated as set to a "1" in the UE specific identification field, a computation is made and the output is updated until the final UE masking sequence of 40 bits is complete.

By using the 32 bit wide matrix of FIG. 14, the number of stored bits required may be further reduced to 512 bits or simply 32 16 bit words.

Figure 15:
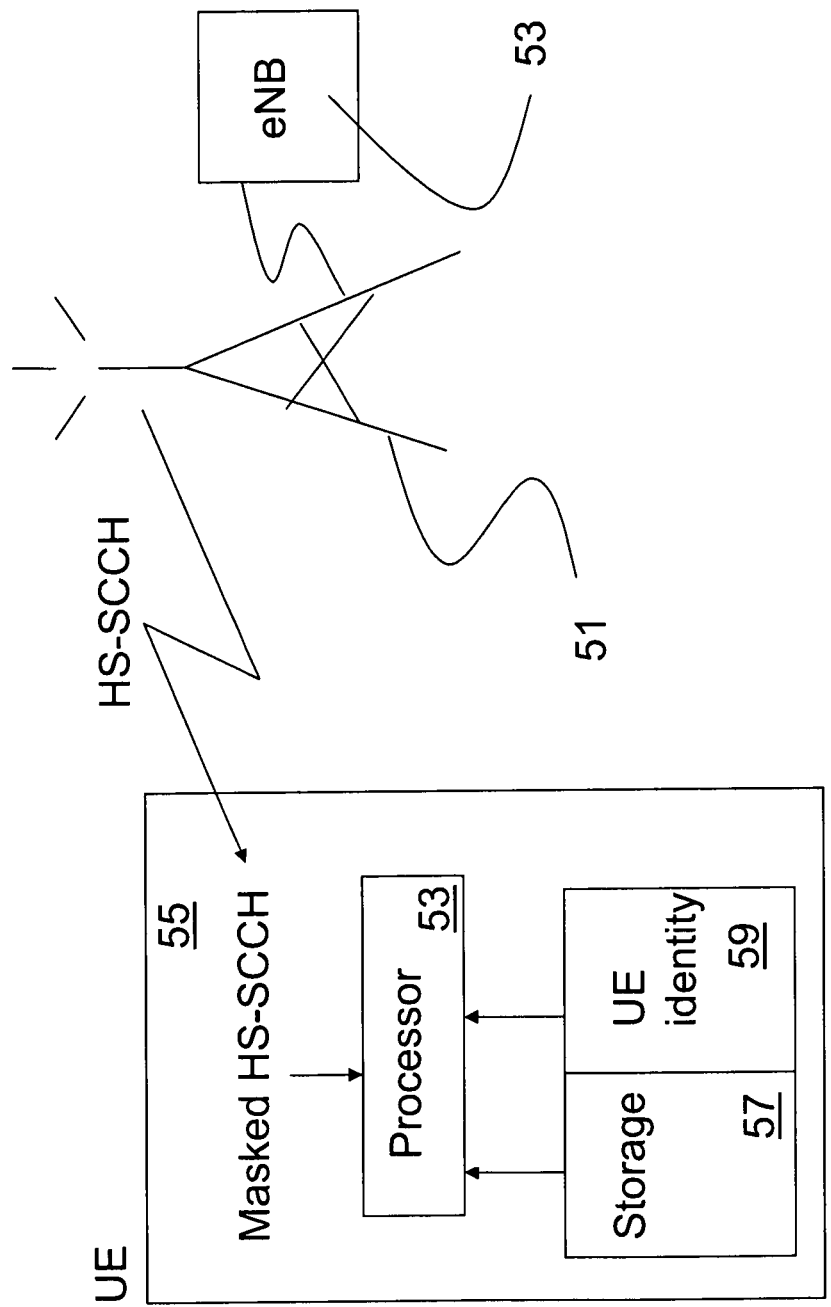
FIG. 15 depicts another exemplary embodiment incorporating features of the present invention.

FIG. 15 depicts an example application of the above embodiments. Illustrative device UE 55 incorporates one of the above illustrated embodiments to perform the UE specific masking sequence generation. In FIG. 15, the UE may include on board storage 57 containing either the large look up table described above, the pair of smaller look up tables described above, or one of the G matrix forms described above. The storage may be implemented as memory, including without limitation fuses, antifuses, EPROM, EEPROM, flash or mask ROM bits. Since the entries in the matrix are fixed, a very dense form of storage such as a mask ROM may be preferred. A UE specific identity field 59 is also stored in the UE. The UE field may be provided dynamically by the network each time the HSDPA service is initially configured or reconfigured by the network, using high level services. The UE identity field is stored within the UE, for example in a processor memory. As a lesser preferred alternative approach, the UE identity field could be a fixed value. This fixed value may be stored as jumpers on a board, in a SIM card, or otherwise stored within the UE. A processor 53 performs the HS-SCCH receiver functions by retrieving the stored information, whether it is a look up table, a pair of look up tables, or a matrix as described above and performing one of the methods above to generate the UE specific masking sequence, which is then used with a scrambling operation applied to the masked HS-SCCH in order to receive the HS-SCCH input in unmasked form.

In operation, a base station transmitting HSDPA protocol communication, eNB 53, transmits a masked HS-SCCH message over an air interface via antenna 51. UE 55 receives the masked HS-SCCH message and processor 53 then retrieves the UE identity from the stored field 59, and the appropriate look up table or matrix data from storage 57. The processor 53 then implements the appropriate method described above to generate the UE specific masking sequence, this sequence is then used as depicted in FIG. 8 to unmask the message for further processing.

As shown in FIG. 15, the UE 55 may be implemented as a single semiconductor integrated circuit including the storage 57 containing the matrix, a processor 53 such as a DSP, RISC, MCU, ARM or uP core, and the UE identity field 59. Alternatively, some of the functions 53, 59 and 56 may be implemented using off the shelf components such as EEPROMS, flash and the like for memory, and an off the shelf processor may be used for processor 53. Alternatively, FPGA and other simple programmable devices may be used for processor 53. The functions described here for the UE 55 may be integrated with other circuitry as single chip ULE solutions, for example. Reusable design cores such as macros supported by semiconductor foundries may be developed that incorporate the functions 53, 57 and 59 of FIG. 15.

The exemplary embodiments described above are described in terms of a UE receiving the HS-SCCH masked message. The UE specific masking sequence is generated as described above and used to unmask the message for use by the UE. However, the same methods and embodiments may be used to perform the UE specific masking sequence used by the transmitter to form the masked HS-SCCH message. For example, a base station or eNB that transmits an HS-SCCH to a UE over the air interface will use the UE specific masking sequence to generate the masked HS-SCCH. The embodiments described herein may provide silicon and computation efficient methods and apparatus to perform the UE specific masking sequence generation and may be applied to mobile UE devices, but also to transmitters such as base stations and the like. The embodiments described herein are not limited to receivers, UEs or handsets, but may also be applied to HSDPA and HS-SCCH transmitters whether fixed or mobile.

Embodiments of the present invention provide an efficient, fast and power conserving implementation of the user equipment specific masking sequence generation for the HS-SCCH in a HSDPA system. Any of the embodiments described above may be used by receivers, transmitters or transceivers to scramble and descramble messages communicated over a shared channel by generating the UE specific masking sequences. Although many parts of this description describe, as non-limiting examples, the application of the embodiments to a receiver such as a UE, the embodiments also apply to and may be advantageously used in a transmitter or transceiver, such as a base station or eNB. These additional embodiments are contemplated as embodiments of the present invention and are within the scope of the invention as defined by the appended claims.

Although various embodiments of the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to advantageously coordinate allocation of resources for user equipment to be handed over from a source base station to a target base station without contention and without a need for sharing timing information therebetween, as described herein.

Moreover, the scope of the present invention is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
receiving a transmitted shared message that is masked with a receiver identification signal and transmitted according to a predetermined protocol;
retrieving stored masking sequence values corresponding to a unique receiver identifier from a masking sequence look up table, wherein the masking sequence look up table comprises a first look up table and a second look up table, wherein the first look up table comprises possible masking sequence values obtained from the predetermined protocol corresponding to a first lower portion of a receiver identifier, and wherein the second look up table comprises possible sequence values obtained from the predetermined protocol corresponding to a second upper portion of the receiver identifier;
unmasking, using a processor, the received shared message using the retrieved stored masking sequence value; and
determining if the unmasked received shared message is valid.

2. The method of claim 1, and further comprising:
determining from the predetermined protocol the possible masking sequence values that may correspond to a unique receiver identifier;
forming the masking sequence look up table of the possible masking sequences indexed by the unique receiver identifier; and
storing the look up table of masking sequences as stored masking sequences.

3. The method of claim 2, wherein the unique stored receiver identifier is 16 bits long.

4. The method of claim 1, wherein the received shared message is a shared control channel message received over an air interface in a packet based network.

5. The method of claim 1, wherein the protocol is the 3G 25.212 protocol.

6. The method of claim 1, and further comprising:
retrieving a first portion of a stored masking sequence by accessing the first look up table with the first lower portion of the unique receiver identifier;

retrieving a second portion of the stored masking sequence by accessing the second look up table with the second upper portion of the unique receiver identifier; and combining the first and second portions to form a retrieved stored masking sequence.

7. The method of claim 6, wherein the first look up table and the second look up table have at least 2n/2 entries, where n is the length in bits of the receiver identifier.

8. The method of claim 1, and further comprising:

determining from a protocol a first generator polynomial used to form a scrambled masking sequence from a device identifier;

determining from the protocol a second generator polynomial used to form the scrambled masking sequence from the device identifier;

applying a rate matching sequence provided by the protocol to the first and second polynomials;

forming a table of matrix values from the polynomials that, when a matrix calculation is performed with the unique receiver identifier, will form a scrambled, rate matched masking sequence corresponding to the receiver identifier; and storing the table of matrix values.

9. The method of claim 8, and further comprising:

retrieving stored matrix values from the stored matrix of values corresponding to a unique receiver identifier of length n by performing a bit wise matrix calculation n times and indexing the table of stored matrix values used in the calculations by incrementing an index from 1 to n, where n is the number of rows in the table of matrix values.

10. An apparatus comprising at least one processor and at least one memory storing computer program code, wherein the at least one memory and stored computer program code are configured, with the at least one processor, to cause the apparatus to at least:

receive, over an air interface, a shared message masked with a receiver identification signal and rate matched according to a predetermined protocol;

store values for unmasking the received shared message in a masking sequence look up table;

retrieve the stored values corresponding to a stored unique receiver identification from the masking sequence look up table;

unmask the received shared message using the retrieved stored values to form an unmasked received shared message; and determine if the unmasked received shared message is valid;

wherein the masking sequence look up table comprises:

a first look up table configured to store possible sequences that are obtained from the predetermined protocol corresponding to a first lower portion of a receiver identifier; and a second look up table configured to store possible sequences that are obtained from the predetermined protocol corresponding to a second upper portion of the receiver identifier.

11. The apparatus of claim 10, wherein the masking sequence lookup table comprises:

a table of possible values obtained using the masking and rate matching provided by the predetermined protocol and corresponding to a unique receiver identification.

12. The apparatus of claim 10, wherein the predetermined protocol further comprises circuitry configured to rate match and mask by performing a convolutional coding on a receiver identification field extended by a number of bits, followed by performing a code puncturing to rate match the masking sequence to a length that is less than three times the length of the receiver identification field in bits.

13. The apparatus of claim 11, wherein the apparatus is further configured to:

access the first look up table indexed by first lower portion of a unique receiver identifier to obtain a first portion of a stored value;

access the second look up table indexed by a second upper portion of a unique receiver identifier to obtain a second portion of the stored value; and form a retrieved stored sequence value from the first and second portions of the stored value.

14. The apparatus of claim 10, wherein the apparatus is further configured to:

control a table of stored matrix values that, when a matrix calculation is performed with a unique receiver identification field, results in a retrieved value corresponding to the value indicated by the protocol for the receiver identification field.

15. The apparatus of claim 14, wherein the apparatus is further configured to:

access the storage circuitry by performing a loop from 1 to n times, where n is the length of the identification field, and accessing the table of matrix values by the loop index; and perform a bit wise matrix manipulation using the value of the unique receiver identification field and the accessed matrix values so as to obtain the retrieved stored sequence.

16. A computer program product comprising at least one non-transitory computer-readable storage medium having computer-readable program instructions stored therein, the computer-readable program instructions comprising:

program instructions configured to receive a transmitted shared message over an air interface that is masked with a receiver identification signal which is rate matched and coded according to a predetermined protocol;

program instructions configured to retrieve a stored masking sequence value corresponding to a unique receiver identifier from a masking sequence look up table;

program instructions configured to unmask the received shared message using the retrieved stored masking sequence value; and program instructions configured to determine if the unmasked received shared message is valid;

wherein the masking sequence look up table comprises:

a first look up table configured to store possible sequences that are obtained from the predetermined protocol corresponding to a first lower portion of a receiver identifier; and a second look up table configured to store possible sequences that are obtained from the predetermined protocol corresponding to a second upper portion of the receiver identifier.

* * * * *